United States Patent [19]
Holling

[11] 3,911,608
[45] Oct. 14, 1975

[54] AUTOMATIC DIP NET

[76] Inventor: John H. Holling, 416 Grove Ave., Ukiah, Calif. 95482

[22] Filed: Dec. 13, 1973

[21] Appl. No.: 424,478

[52] U.S. Cl. ............................................ 43/5; 43/25
[51] Int. Cl.² ........................................... A01K 97/14
[58] Field of Search .............. 43/5, 17.2, 19, 18, 25

[56] References Cited
UNITED STATES PATENTS

| | | | |
|---|---|---|---|
| 1,226,162 | 5/1917 | Attula | 43/19 |
| 2,641,078 | 6/1953 | Gearien | 43/5 |
| 3,267,603 | 8/1966 | Josephs et al. | 43/5 |
| 3,363,355 | 1/1968 | Kellner | 43/5 |
| 3,401,478 | 9/1968 | Lambert | 43/5 |

Primary Examiner—Warner H. Camp

[57] ABSTRACT

The invention involves an automatic dip net in the form of a tubular device supportable upon a fishing pole and which is automatically released in response to a tug on the line by a fish grabbing a baited hook, whereupon the device will slide down the line and snare means on the device will ultimately snare the fish as it is being reeled in.

3 Claims, 6 Drawing Figures

AUTOMATIC DIP NET

My invention relates to fishing and more particularly to fishing tackle.

It is current practice when reeling in a fish caught on a hook, to utilize a dip net to secure such fish as it approaches a landing. Frequently, however, a fish, if not securely hooked, may in its struggles, free itself beyond reach of the dip net, and is lost to the fisherman.

Among the objects of my invention are: 1. To provide a type of dip net adapted to snare a fish long before it can be reeled in within reach of a conventional dip net;

2. To provide an automatic dip net adapted to be released for action by a tug on the line resulting from the fish grabbing a baited hook;

3. To provide a novel and improved automatic dip net which is very simple and economical to manufacture.

Additional objects of my invention will be brought out in the following description of the preferred embodiment of the same, taken in conjunction with the accompanying drawings wherein.

Figure 1:
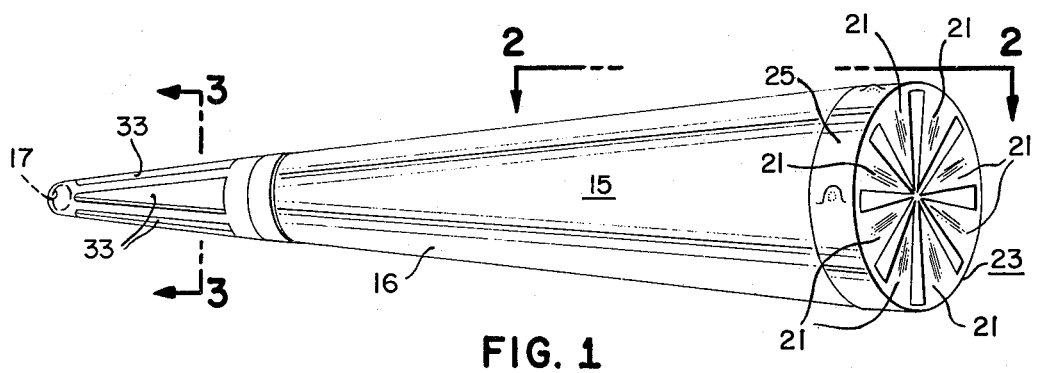
FIG. 1 is a view in perspective of the device of the present invention.
Figure 3:
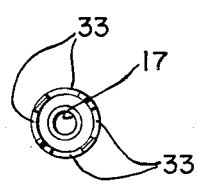
FIG. 3 is a view in section, taken in the plane 3—3 of FIG. 1.
Figure 2:
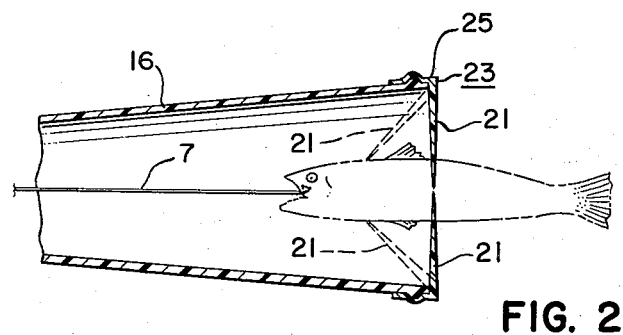
FIG. 2 is a fragmentary view in section taken in the plane 2—2 of FIG. 1 and depicting the manner of snaring a fish.
Figure 4:
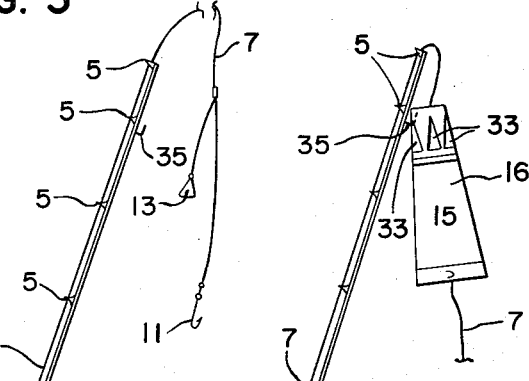
FIG. 4 is a view of a fishing pole assembly ready for a cast, showing the manner of temporarily supporting the device of FIG. 1 thereon to permit of such cast.
Figure 5:
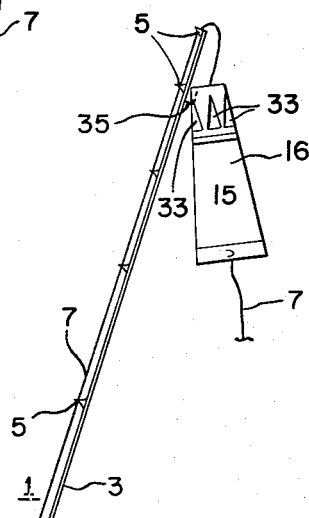
FIG. 5 is a corresponding view depicting the positioning of the device of FIG. 1, following a cast.
Figure 6:
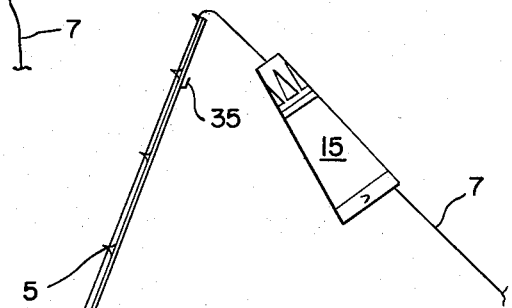
FIG. 6 is a view depecting release of the device in response to a tug on the line by a fish grabbing the baited hook.

Referring to the drawings for details of my invention in its preferred form, the same is applicable for use with any conventional fishing pole assembly 1 involving a fishing pole 3 having a plurality of line guides 5 through which a fishing 7 line is threaded from a reel 9 installed at the handle end of the pole. The free end of the line carries a hook 11 and sinker 13, which, after the hook is baited, are cast out into the water.

The automatic dip net 15 of the present invention is in a form of a tubular element 16, preferably tapered, and open at both ends to permit assembling of the device over and along the pole, down to the reel, with the opening 17 at the smaller end, of sufficient diameter to adequately clear the line guides.

The larger end should be of sufficient diameter to receive at least the head end of the particular fish sought after, but preferably roomy enough to receive substantially the entire fish.

Spanning the larger end, is a means adapted to snare a fish entering this end of the device, such means permitting free entrance but blocking escape after the fish has entered.

Such snare means, in its most simple form, may comprise a plurality of triangular shaped tabs 21 hingedly mounted at their bases to the peripheral edge of this end of the device, and extending radially to approximately the axis thereof. In the preferred construction, the tabs will form part of a cap 23 including a rim 25 adapted to slip over the proximate end of the tubular element, with the triangular tabs extending radially therefrom toward the axis of the device. This cap should preferably be removably secured to the tubular element, which can be accomplished in any conventional manner, either as a bayonet and slot locking means, or by forming a plurality of teats or protuberances about the rim of the tubular element, which can then snap into corresponding recesses formed in the rim of the cap.

In use, the device is slipped over the fishing pole and permitted to rest against the reel seat or corresponding portion of the pole assembly, and with the hook baited, the baited hook and sinker are cast out into the water, while maintaining a hold on the device. Should a fish grab the baited hook, the device may then be slid off the pole and permitted to slide down the line. As the fish is reeled in, it will become apparent that at some point, the fish will be drawn into the device causing an inward flexing of the triangular tabs to snare the fish and preclude its escape. Thereafter, the fish can no longer effectively struggle to free himself from the hook and can readily be landed, during which procedure, water is free to flow through the device and thus, the device offers little resistance to the retrieving operation. Such resistance may be further minimized by providing adjacent the narrow end of the device, a plurality of openings 33 in the wall thereof which will offer more freedom of movement of water therethrough.

To render the device somewhat more automatic in its operation, the pole, on its underside and at a point spaced from the far end thereof, may be provided with a shallow open hook 35 on which the device may be hung following a cast, such being permitted by the fact that the portion of the line beyond the pole is at this stage, in a slack condition.

Should a fish, however, take the bait while the device is suspended from this hook 35, the resulting tug will tension the line and lift the device off the hook, to free it and permit the same to slide down the line and perform its ultimate function of snaring the fish.

In lieu of casting with the pole, some fishermen prefer to anchor the pole to the shore and cast the bait by hand or with a throw arm. If this procedure is followed, the device, when resting against the reel seat, will remain in position and need not be held by hand. Following a cast, the device will then be slipped over the end of the pole and suspended from the hook on the underside of the pole. The side openings 33 will provide adequate means for suspending the device from such hook, and no special means need be provided.

The device should be formed throughout of waterproof material, and preferably should have an overall specific gravity greater than that of the water, whereby the device will not hesitate to enter the water and approach a fish on the baited hook. Once the device settles over the fish, the fish becomes more or less immobilized and is no longer free to struggle, and consequently, even should the hook not be firmly set in the fish, the fish is in no position to escape and may be readily retrieved.

Even, per chance, should the hook come free after the fish had been snared, the hook and sinker, if one or both are within the device, can become snagged in the side openings 33 toward the narrow end of the device, thus affording the fisherman an excellent opportunity of still retrieving the fish as well as the device.

From the foregoing description of my invention in its preferred form, it will be apparent that the same fulfills all the objects of my invention as set forth, and while I have illustrated and described my invention in its preferred form, it will become apparent that the same is subject to alteration and modification without departing from the underlying principles involved therein, and I accordingly do not desire to be limited in my protection to the specific details illustrated and described except as may be necessitated by the appended claims.

I claim:

1. An automatic dip net for snaring a fish on a hook comprising a device having an opening at one end of a size to permit entrance of a fish, means at said end for snaring a fish entering said end of the device, means enabling said device to slide along fishing line from a fishing pole toward a baited hook in water, means included in said device for supporting said device on a fishing pole with such line running through it, a fishing pole having means for suspending said device therefrom, said last means enabling release of said device from said pole in response to a tug on said line, to free it for sliding down said line.

2. In combination a fishing pole with a reel mounted thereon, a line extending from said reel through a plurality of guides along said pole and terminating in a hook, an automatic dip net comprising a tubular device open at both ends surrounding said pole and line adjacent said reel, said tubular device being adapted to be slid along said pole and over said guides and down a line following a cast, to permit entrance of a fish caught on said hook as one reels in said line, means spanning the entrance end of said device, enabling entrance of a fish but blocking its escape, means on said pole for hanging said device following a cast and adapted to release said device in response to a tug on said line by a fish caught on said hook, whereby said device can slide on said line relative to said fish as said fish is reeled in, whereupon said fish can be trapped as it enters said device.

3. A combination in accordance with claim 2 characterized by said means for hanging said device for release in response to a line tug, comprising a hook carried on the underside of said pole.

* * * * *